Patented Apr. 19, 1938

2,114,651

UNITED STATES PATENT OFFICE 2,114,651

PROCESS FOR SEPARATING PETROLEUM EMULSIONS

Ivor M. Colbeth, East Orange, N. J., assignor to The Baker Castor Oil Company, New York, N. Y., a corporation of New Jersey No Drawing. Application January 14, 1936, Serial No. 59,090

4 Claims. (Cl. 196—4)

This application is a continuation in part of my earlier applications Serial Numbers 567,753; 719,293 and 757,124.

This invention relates to the treating of oil and water emulsions and more particularly to a process for treating petroleum oil containing emulsion of oil and water and/or foreign matter commonly known as cut oil, wet oil, roily oil, emulsified oil, bottom settlings, B. S., etc., to break the emulsion and to separate the water and foreign matter from the oil.

The presence of emulsion in petroleum oil is undesirable because the oils containing emulsions cannot be distilled satisfactorily. Therefore refineries and pipe lines refuse to buy oil which has more than a pre-determined amount of water and/or foreign matter in oil emulsion therein.

The emulsions formed from petroleum from different localities vary in composition and character. This is due to adsorbed earthy matter, asphaltic matter, paraffinic matter, colloidal matter, water, brine, and the manner in which the oil is lifted or pumped from the well.

I have discovered that petroleum emulsions can be broken and the water and/or other foreign matter separated from the oil by means of treating agents comprising polymerized fatty oils and accordingly it is an object of this invention to treat petroleum emulsions by this means.

The preferred polymerized fatty oil is polymerized castor oil, as it has charaacteristics of superiority above the other polymerized oils. Other fatty oils susceptible to polymerization and capable of preparation suitable for treating petroleum emulsions may be used, such as rape oil, corn oil, olive oil, and sardine oil, and the like.

Satisfactory polymerized fatty oils for breaking the petroleum emulsions may be obtained by heating and stirring the fatty oils in any suitable container equipped with a stirring device, at elevated temperatures, preferably at temperatures ranging from about 390° F. to about 800° F. The time and temperature used during the heating should be such as to prevent a gel from being formed and to prevent the glycerine from being split off.

A satisfactory polymerized oil for treating petroleum emulsions may be prepared, for example, by heating and stirring castor oil while excluding the air to a temperature of 475° F to 700° F. for a time period of about 4 to about 10 hours, depending largely upon the temperature employed. After allowing the fatty oil to cool it is ready for use.

The time and temperature required for polymerizing fatty oils may be varied. As petroleum emulsions vary in character the degree of polymerization suitable for particular types of petroleum emulsion may be determined by test.

The polymerized fatty oils may be mixed or combined with a viscosity reducing solvent in order to facilitate ease of handling, feeding, etc. Suitable viscosity reducing solvents may be selected from the solvents such as benzol, toluol, anthracene oil, xylene, propyl alcohol, acetone, pine oil, petroleum solvents and the like.

In practicing the process a small amount of the polymerized oil may be fed into the emulsion by means of pressure lubricators or pumps of the types now in general use in the oil fields, for mixing with the emulsion, approximately one part of polymerized oil to amounts of the emulsion ranging from 500 parts of emulsion to 10,000 parts of emulsion, depending upon the type and kind of emulsion being treated, and the mass allowed to stand until the emulsion breaks and separates into an upper layer of oil and a lower layer of water and/or foreign matter. The water and/or foreign matter are afterwards drawn off from the commercial oil. In most cases mixing the polymerized fatty oil with the emulsion in the usual manner is sufficient to break and separate the emulsion in a period of time of one to six hours but in some cases where tight emulsions are being treated heat and/or agitation may be applied by the usual methods employed in the oil fields and a period of time from one hour to eighteen hours may be required to separate the emulsion.

Instead of polymerizing the oils as indicated above for the purpose of breaking emulsions, these oils may be polymerized in other ways, as, for example, by using a catalyst. Aluminum chloride, zinc chloride, iron chloride have been found particularly suitable.

In addition to this, boron trichloride or trifluoride, which are gases, act on the oils yielding polymerized products. Derivatives of boron, such as boric acid, sodium borate, boron trioxide are very suitable for polymerizing castor oil in particular. They do not normally react with other fatty oils unless such oils are first oxidized after which polymerized products can be formed in the same way as from castor oil.

As a specific example of carrying out this invention castor oil is treated with about 1% to 10% by weight of a boron compound, such as borax, boric acid or boric anhydride at a temperature of about 200° C. for about 30 minutes or until foaming substantially completely ceases. Somewhat higher temperatures may be used for a shorter time and lower temperatures require longer times.

If boron trichloride or trifluoride is used the oil need not be heated but it is necessary only to bubble the trichloride or trifluoride through the oil to effect polymerization.

I claim:

1. A process for breaking petroleum emulsions which comprises treating the emulsion with an unoxidized polymerized fatty oil.

2. A process for breaking petroleum emulsions which comprises treating the emulsion with unoxidized castor oil.

3. A process for breaking petroleum emulsions which comprises treating the emulsion with unoxidized polymerized rape oil.

4. A process for breaking petroleum emulsions which comprises treating the emulsion with unoxidized polymerized corn oil.

IVOR M. COLBETH.

CERTIFICATE OF CORRECTION.

Patent No. 2,114,651. April 19, 1938.

IVOR M. COLBETH.

It is hereby certified that error appears in the printed specification of the above numbered patent requiring correction as follows: Page 2, second column, line 2-3, claim 2, after the word "unoxidized" insert polymerized; and that the said Letters Patent should be read with this correction therein that the same may conform to the record of the case in the Patent Office.

Signed and sealed this 5th day of July, A. D. 1938.

(Seal)

Henry Van Arsdale,
Acting Commissioner of Patents.